US012559694B2

(12) United States Patent
Lee et al.

(10) Patent No.: US 12,559,694 B2
(45) Date of Patent: Feb. 24, 2026

(54) CHELATED LITHIUM MOLYBDATE LUBRICANT ADDITIVE, PREPARATION METHOD AND APPLICATION THEREOF

(71) Applicant: Tat Wing Lee, Hong Kong (CN)

(72) Inventors: Tat Wing Lee, Hong Kong (CN);
YeungChu Chan, Hong Kong (CN)

(73) Assignee: Tat Wing Lee, Hong Kong (CN)

( * ) Notice: Subject to any disclaimer, the term of this patent is extended or adjusted under 35 U.S.C. 154(b) by 131 days.

(21) Appl. No.: 18/736,131

(22) Filed: Jun. 6, 2024

(65) Prior Publication Data

US 2024/0336863 A1     Oct. 10, 2024

Related U.S. Application Data

(63) Continuation of application No. PCT/CN2024/085750, filed on Apr. 3, 2024.

(30) Foreign Application Priority Data

Apr. 7, 2023     (CN) .......................... 202310362382.1

(51) Int. Cl.
| | |
|---|---|
| *C10M 141/12* | (2006.01) |
| *C09C 1/42* | (2006.01) |
| *C09C 3/12* | (2006.01) |
| *C10M 133/06* | (2006.01) |
| *C10M 139/04* | (2006.01) |
| *C10M 169/04* | (2006.01) |
| *C10M 177/00* | (2006.01) |

(52) U.S. Cl.
CPC ............. *C10M 141/12* (2013.01); *C09C 1/42* (2013.01); *C09C 3/12* (2013.01); *C10M 133/06* (2013.01); *C10M 139/04* (2013.01); *C10M 169/04* (2013.01); *C10M 177/00* (2013.01); *C10M 2201/14* (2013.01); *C10M 2203/003* (2013.01); *C10M 2215/26* (2013.01)

(58) Field of Classification Search
CPC ............. C01P 2004/62; C01P 2004/61; C10N 2010/02; C10N 2020/077; C10N 2030/06; C10N 2010/12; C09C 3/12; C09C 1/42; C10M 133/06; C10M 141/12; C10M 177/00; C10M 139/00; C10M 139/04; C10M 169/04; C10M 2227/04; C10M 2203/003; C10M 2201/14; C10M 2215/26; C10M 2227/066; C10M 2201/103
See application file for complete search history.

(56) References Cited

U.S. PATENT DOCUMENTS

2018/0355275 A1* 12/2018 Oshita ...................... C09D 5/02

FOREIGN PATENT DOCUMENTS

CN        113308286 A  *  8/2021  .......... C10M 125/30

* cited by examiner

*Primary Examiner* — Vishal V Vasisth
(74) *Attorney, Agent, or Firm* — WPAT, PC

(57) ABSTRACT

A preparation method of a chelated lithium molybdate lubricant additive includes: adding kaolin and HDTMS into deionized water, performing magnetic stirring and ultrasonic treatment, then stirring to perform a reaction, and after the reaction is finished, filtering, washing and drying a reaction product to obtain alkylated kaolin; adding the alkylated kaolin and APTMS into deionized water, performing magnetic stirring and ultrasonic treatment, then stirring to perform a reaction, and after the reaction is finished, centrifuging, washing and drying a reaction product to obtain amino/alkylated kaolin; adding the amino/alkylated kaolin into a chelated lithium molybdate ionic liquid, stirring for a reaction, and after the reaction is finished, filtering, washing and drying a reaction product to obtain the chelated lithium molybdate lubricant additive. The prepared lubricant additive has good dispersibility in base oil, and performs well in friction reduction and anti-wear.

20 Claims, No Drawings

CHELATED LITHIUM MOLYBDATE LUBRICANT ADDITIVE, PREPARATION METHOD AND APPLICATION THEREOF

This application is a CON of PCT/CN2024/085750, filed Apr. 3, 2024.

TECHNICAL FIELD

The disclosure relates to the technical field of lubricants, particularly to a chelated lithium molybdate lubricant additive, a preparation method and an application thereof.

BACKGROUND

Lubricant is a liquid or semi-solid substance applied to mechanical components in industries such as aviation, mechanical processing, metallurgy, automobiles, transportation, and coal to reduce friction, and protect machinery and processed parts. The lubricant mainly plays roles in lubrication, auxiliary cooling, antirust, cleaning, sealing, and buffering, etc. It is generally composed of two parts, i.e., base oil and a lubricant additive. Specially, the base oil is the main component of the lubricant and determines basic properties of the lubricant. Moreover, the lubricant additive is used to make up for deficiencies and improve performance of the base oil, and to endow the lubricant some new properties. Therefore, the lubricant additive is of great importance in the lubricant; and a type, a quality, and an additive amount of the lubricant additive in the lubricant directly affect the properties of the lubricant.

A nanoscale lubricant additive is mainly used as a friction reducing agent, an anti-wear agent, an extreme pressure additive, a friction modifier, etc. in lubrication, and has a special effect (such as a surface interface effect, a small-size effect, a volume effect, etc.), so that the nanoscale lubricant additive has new physical and chemical characteristics and has excellent performance compared with a traditional lubricant additive or a traditional lubricant, and therefore the nanoscale lubricant additive has a prospect of substituting for the traditional lubricant additive.

With an emphasis on environmental protection and a continuous development of nanoscale materials, the development towards green, pollution-free/low-pollution micro/nano lubricant additives has become a rapid development research direction. Two-dimensional layered materials, which are widely used in solid lubricants, have a layered structure. The layered structure makes atoms in each atomic layer bond together by strong covalent bonds, and adjacent atomic layers are bonded together by weak Van der Waals forces, so that the adjacent atomic layers are easy to slip from one to another. Silicates contained in the two-dimensional layered materials cause no pollution to the environment and are inexpensive. Previous studies have shown that the silicates, such as kaolin, montmorillonite, serpentine, etc., have certain effects in friction reduction and anti-wear as the lubricant additives.

Chinese patent with publication No. CN107446682A discloses a high-performance water-soluble lubricant used in a rack, including the following components in parts by weight: 80-100 parts of base oil, 3-5 parts of hydroxyethyl cellulose, 6-8 parts of sodium polyacrylate, 8-12 parts of ethylene glycol, 1-2 parts of modified graphite powder, 3-9 parts of a mixture of nanoscale kaolin and nanoscale alumina, 0.3-0.5 parts of polyvinyl alcohol emulsion, 5-15 parts of stabilizer, 2-10 parts of surfactant, 0.2-1 parts of defoamer, and 30-70 parts of deionized water. The above various additives are mixed to improve various properties of the lubricant and increase stability and lubrication effect of the lubricant, thereby preventing a tooth surface of the rack wearing and scratching. Therefore, the service life of the rack is prolonged.

However, the kaolin itself has the characteristics of solid granularity, high chemical activity, easy adsorption, etc., resulting in poor dispersion stability of the kaolin in a liquid lubrication medium. Furthermore, the kaolin is easy to agglomerate to generate precipitation, which can not only weaken functions of the friction reduction, anti-wear, and self-repairing, but also can cause abrasive particle wear due to the agglomeration.

Ionic liquids have excellent properties such as non-volatility, non-flammability, thermal stability, low melting point, and good conductivity, so that the ionic liquids are ideal lubrication materials. In 2001, it is found that the ionic liquid is a multi-purpose lubricant with excellent performance for the first time around the world, and then researchers deeply and systematically research ionic-liquid lubrication materials, thereby causing extensive attention of the researchers at home and abroad. Nowadays, the ionic liquids have been widely used as the base oil, the additives, lubrication films, conductive grease, etc. Studies have found that a common ionic liquid is soluble in the polyethylene glycol with a larger polarity, but its solubility in a hydrocarbon lubricant with a smaller polarity is very small (i.e., much less than 1%).

SUMMARY

In order to overcome the deficiencies in the related art, an objective of the disclosure is to provide a chelated lithium molybdate lubricant additive, a preparation method and an application thereof, and the prepared lubricant additive has good dispersibility in base oil and performs well in friction reduction and anti-wear.

In order to achieve the above objective, the disclosure adopts the following technical solution.

A preparation method of a chelated lithium molybdate lubricant additive includes the following steps:

step 1, adding kaolin and hexadecyltrimethoxysilane (abbreviated as HDTMS with a chemical formula of $C_{19}H_{42}O_3Si$) into deionized water, performing magnetic stirring and ultrasonic treatment on the deionized water added with the kaolin and the HDTMS to obtain a first mixture, stirring the first mixture to perform a first reaction, and after the first reaction is finished, obtaining a first reacted mixture, filtering the first reacted mixture to obtain a first reaction product, washing and drying the first reaction product to obtain alkylated kaolin;

step 2, adding the alkylated kaolin obtained in the step 1 and (3-aminopropyl)trimethoxysilane (abbreviated as APTMS with a chemical formula of $C_6H_{17}NO_3Si$) into deionized water, performing magnetic stirring and ultrasonic treatment on the deionized water added with the alkylated kaolin and the APTMS to obtain a second mixture, stirring the second mixture to perform a second reaction, and after the second reaction is finished, obtaining a second reacted mixture, centrifuging the second reacted mixture to obtain a second reaction product, washing and drying the second reaction product to obtain amino/alkylated kaolin; and step 3, adding the amino/alkylated kaolin obtained in the step 2 into a chelated lithium molybdate ionic liquid to obtain a third mixture, stirring the third mixture to perform a third reaction, and after the third reaction is finished, obtaining a third reacted mixture, filtering the third reacted mixture to obtain a third reaction product, washing and drying the third reaction product to obtain the chelated lithium molybdate lubricant additive.

In an embodiment, in the step 1, a mass-to-volume ratio of the kaolin:the HDTMS:the deionized water is 1 gram (g):0.05-0.5 g:100 milliliters (mL).

In an embodiment, in the step 1, a time for the magnetic stirring is in a range of 10 minutes (min) to 20 min; a time for the ultrasonic treatment is in a range of 30 min to 60 min; a temperature for the first reaction is in a range of 40 degrees Celsius (° C.) to 60° C.; and a time for the first reaction is in a range of 2 hours (h) to 6 h.

In an embodiment, in the step 2, a mass-to-volume ratio of the alkylated kaolin:the APTMS:the deionized water is 1 g:0.05-0.2 g:100 mL.

In an embodiment, in the step 2, a time for the magnetic stirring is in a range of 15 min to 30 min; a time for the ultrasonic treatment is in a range of 10 min to 20 min; a temperature for the second reaction is in a range of 50° C. to 80° C.; and a time for the second reaction is in a range of 4 h to 10 h.

In an embodiment, in the step 3, a chemical formula of the chelated lithium molybdate ionic liquid is $Li_2C_{10}H_{16}N_2O_8Mo$, and a concentration of the chelated lithium molybdate ionic liquid is in a range of 0.1 wt % to 1 wt %.

In an embodiment, in the step 3, a preparation method of the chelated lithium molybdate ionic liquid includes the following steps: weighing ethylenediaminetetraacetic acid (EDTA) and dissolving the EDTA in an ammonia solution to obtain an EDTA solution with a concentration of 1 mole per liter (mol/L); and weighing lithium acetate (abbreviated as LiOAc with a chemical formula of $CH_3COOLi$) and molybdenum nitrate (with a chemical formula of $Mo(NO_3)_4$) to add into the EDTA solution according to a molar ratio of the EDTA:Li:Mo being 1:1-2:0.5-1, and stirring the EDTA solution added with the LiOAc and $Mo(NO_3)_4$ to perform a fourth reaction at 80° C. for 2 h to obtain the chelated lithium molybdate ionic liquid.

In an embodiment, in the step 3, a temperature for the third reaction is in a range of 70° C. to 90° C.; a time for the third reaction is in a range of 6 h to 10 h; and a mass-to-volume ratio of the amino/alkylated kaolin to the chelated lithium molybdate ionic liquid is 1 g:30-50 mL.

The disclosure further provides a chelated lithium molybdate lubricant additive obtained by the above preparation method.

The disclosure further provides an application method of the chelated lithium molybdate lubricant additive, including: applying the chelated lithium molybdate lubricant additive in a lubricant; and a concentration of the chelated lithium molybdate lubricant additive in the lubricant is in a range of 0.01 wt % to 0.13 wt %.

In an embodiment, the lubricant includes: a KUNLUN SCORPION F5000 lubricant, a SF15W-40 lubricant, a GREAT WALL SJ10W-40 lubricant, mineral base oil, or synthetic base oil.

Compared with the related art, the disclosure has the following beneficial effects.

1. In view of the chelated lithium molybdate lubricant additive prepared by the disclosure, the layered structure of the kaolin is conducive to reducing momentum transfer between fluid layers, thereby separating the fluid layers to reduce fluid resistance and lower oil viscosity. The disclosure uses the HDTMS and the APTMS to modify the kaolin in sequence to increase the dispersibility of kaolin in the lubricant, which can bring more molecules of the lubricant into a surface of friction pairs and then form a mechanical deposition film in pits of the friction pairs, thereby realizing functions of filling and repairing and then improving lubrication efficiency of the lubricant.

2. The chelated lithium molybdate lubricant additive prepared by the disclosure grafts chelated lithium molybdenum ions onto the surface of amino/alkylated kaolin, increasing the solubility of chelated lithium molybdenum ions with oil phase. During the friction process, the chelated lithium molybdenum ions can undergo complex frictional chemical reactions with elements on the surface of the friction pairs, thereby generating a boundary lubrication film on the surface of the friction pairs to make the lubricant additive perform well in friction reduction and anti-wear.

DETAILED DESCRIPTION OF EMBODIMENTS

In order to make the objectives, technical solutions, and advantages of the disclosure clearer, the disclosure will be further described in detail below with reference to embodiments. However, the specific embodiments described herein are merely used to explain the disclosure and are not intended to limit the disclosure.

Unless otherwise specified, chemical reagents and materials used in the disclosure are all available in a market or are all synthesized by commercially available raw materials.

Kaolin is available from Fuhua Nanomaterials Co., Ltd, and a particle size of the kaolin is in a range of 0.5 micrometers (μm) to 2 μm.

A chelated lithium molybdate ionic liquid is provided by Yatian Group.

The disclosure will be further described below with reference to specific embodiments.

Embodiment 1

A preparation method of a chelated lithium molybdate lubricant additive includes the following steps.

Step 1, 1 gram (g) of kaolin and 0.5 g of hexadecyltrimethoxysilane (abbreviated as HDTMS with a chemical formula of $C_{19}H_{42}O_3Si$) are added into 100 milliliters (mL) of deionized water, magnetic stirring is performed on the deionized water added with the kaolin and the HDTMS for 20 minutes (min), and then ultrasonic treatment is performed for 60 min to obtain a first mixture, the first mixture is stirred at 60 degrees Celsius (° C.) for 6 hours (h) to perform a first reaction, and after the first reaction is finished, a first reacted mixture is obtained, the first reacted mixture is filtered to obtain a first reaction product, and the first reaction product is washed and dried to obtain alkylated kaolin.

Step 2, 1 g of the alkylated kaolin obtained in the step 1 and 0.2 g of (3-aminopropyl)trimethoxysilane (abbreviated as APTMS with a chemical formula of $C_6H_{17}NO_3Si$) are added into 100 mL of deionized water, magnetic stirring is performed on the deionized water added with the alkylated kaolin and the APTMS for 30 min, and then ultrasonic treatment is performed for 20 min to obtain a second mixture, the second mixture is stirred at 80° C. for 10 h to perform a second reaction, and after the second reaction is finished, a second reacted mixture is obtained, the second reacted mixture is centrifuged to obtain a second reaction product, and the second reaction product is washed and dried to obtain amino/alkylated kaolin.

Step 3, 1 g of the amino/alkylated kaolin obtained in the step 2 is added into 50 mL of a chelated lithium molybdate ionic liquid with a concentration of 1 wt % to obtain a third mixture, the third mixture is stirred at 90° C. for 10 h to perform a third reaction, and after the third reaction is finished, a third reacted mixture is obtained, the third reacted mixture is filtered to obtain a third reaction product, and the third reaction product is washed and dried to obtain the chelated lithium molybdate lubricant additive.

The prepared lubricant additive (also referred as to the chelated lithium molybdate lubricant additive) is added into a SF15W-40 lubricant according to a concentration of the prepared lubricant additive being 0.13 wt %.

Embodiment 2

A preparation method of a chelated lithium molybdate lubricant additive includes the following steps.

Step 1, 1 g of kaolin and 0.05 g of HDTMS are added into 100 mL of deionized water, magnetic stirring is performed on the deionized water added with the kaolin and the HDTMS for 10 min, and then ultrasonic treatment is performed for 30 min to obtain a first mixture, the first mixture is stirred at 40° C. for 2 h to perform a first reaction, and after the first reaction is finished, a first reacted mixture is obtained, the first reacted mixture is filtered to obtain a first reaction product, and the first reaction product is washed and dried to obtain alkylated kaolin.

Step 2, 1 g of the alkylated kaolin obtained in the step 1 and 0.05 g of APTMS are added into 100 mL of deionized water, magnetic stirring is performed on the deionized water added with the alkylated kaolin and the APTMS for 15 min, and then ultrasonic treatment is performed for 10 min to obtain a second mixture, the second mixture is stirred at 50° C. for 4 h to perform a second reaction, and after the second reaction is finished, a second reacted mixture is obtained, the second reacted mixture is centrifuged to obtain a second reaction product, and the second reaction product is washed and dried to obtain amino/alkylated kaolin.

Step 3, 1 g of the amino/alkylated kaolin obtained in the step 2 is added into 30 mL of a chelated lithium molybdate ionic liquid with a concentration of 0.1 wt % to obtain a third mixture, the third mixture is stirred at 70° C. for 6 h to perform a third reaction, and after the third reaction is finished, a third reacted mixture is obtained, the third reacted mixture is filtered to obtain a third reaction product, and the third reaction product is washed and dried to obtain the chelated lithium molybdate lubricant additive.

The prepared lubricant additive is added into a SF15W-40 lubricant according to a concentration of the prepared lubricant additive being 0.01 wt %.

Embodiment 3

A preparation method of a chelated lithium molybdate lubricant additive includes the following steps.

Step 1, 1 g of kaolin and 0.2 g of HDTMS are added into 100 mL of deionized water, magnetic stirring is performed on the deionized water added with the kaolin and the HDTMS for 15 min, and then ultrasonic treatment is performed for 40 min to obtain a first mixture, the first mixture is stirred at 50° C. for 3 h to perform a first reaction, and after the first reaction is finished, a first reacted mixture is obtained, the first reacted mixture is filtered to obtain a first reaction product, and the first reaction product is washed and dried to obtain alkylated kaolin.

Step 2, 1 g of the alkylated kaolin obtained in the step 1 and 0.1 g of APTMS are added into 100 mL of deionized water, magnetic stirring is performed on the deionized water added with the alkylated kaolin and the APTMS for 20 min, and then ultrasonic treatment is performed for 15 min to obtain a second mixture, the second mixture is stirred at 60° C. for 6 h to perform a second reaction, and after the second reaction is finished, a second reacted mixture is obtained, the second reacted mixture is centrifuged to obtain a second reaction product, and the second reaction product is washed and dried to obtain amino/alkylated kaolin.

Step 3, 1 g of the amino/alkylated kaolin obtained in the step 2 is added into 40 mL of a chelated lithium molybdate ionic liquid with a concentration of 0.6 wt % to obtain a third mixture, the third mixture is stirred at 80° C. for 8 h to perform a third reaction, and after the third reaction is finished, a third reacted mixture is obtained, the third reacted mixture is filtered to obtain a third reaction product, and the third reaction product is washed and dried to obtain the chelated lithium molybdate lubricant additive.

The prepared lubricant additive is added into a SF15W-40 lubricant according to a concentration of the prepared lubricant additive being 0.05 wt %.

Embodiment 4

A preparation method of a chelated lithium molybdate lubricant additive includes the following steps.

Step 1, 1 g of kaolin and 0.3 g of HDTMS are added into 100 mL of deionized water, magnetic stirring is performed on the deionized water added with the kaolin and the HDTMS for 18 min, and then ultrasonic treatment is performed for 50 min to obtain a first mixture, the first mixture is stirred at 55° C. for 5 h to perform a first reaction, and after the first reaction is finished, a first reacted mixture is obtained, the first reacted mixture is filtered to obtain a first reaction product, and the first reaction product is washed and dried to obtain alkylated kaolin.

Step 2, 1 g of the alkylated kaolin obtained in the step 1 and 0.15 g of APTMS are added into 100 mL of deionized water, magnetic stirring is performed on the deionized water added with the alkylated kaolin and the APTMS for 25 min, and then ultrasonic treatment is performed for 15 min to obtain a second mixture, the second mixture is stirred at 70° C. for 8 h to perform a second reaction, and after the second reaction is finished, a second reacted mixture is obtained, the second reacted mixture is centrifuged to obtain a second reaction product, and the second reaction product is washed and dried to obtain amino/alkylated kaolin.

Step 3, 1 g of the amino/alkylated kaolin obtained in the step 2 is added into 45 mL of a chelated lithium molybdate ionic liquid with a concentration of 0.8 wt % to obtain a third mixture, the third mixture is stirred at 80° C. for 9 h to perform a third reaction, and after the third reaction is finished, a third reacted mixture is obtained, the third reacted mixture is filtered to obtain a third reaction product, and the third reaction product is washed and dried to obtain the chelated lithium molybdate lubricant additive.

The prepared lubricant additive is added into a SF15W-40 lubricant according to a concentration of the prepared lubricant additive being 0.1 wt %.

Comparative Example 1

A preparation method of a lubricant additive includes the following steps.

Step 1, 1 g of kaolin and 0.2 g of APTMS are added into 100 mL of deionized water, magnetic stirring is performed on the deionized water added with the kaolin and the APTMS for 30 min, and then ultrasonic treatment is performed for 20 min to obtain a first mixture, the first mixture is stirred at 80° C. for 10 h to perform a first reaction, and after the first reaction is finished, a first reacted mixture is obtained, the first reacted mixture is centrifuged to obtain a first reaction product, and the first reaction product is washed and dried to obtain aminated kaolin.

Step 2, 1 g of the aminated kaolin obtained in the step 1 is added into 50 mL of a chelated lithium molybdate ionic liquid with a concentration of 1 wt % to obtain a second mixture, the second mixture is stirred at 90° C. for 10 h to perform a second reaction, and after the second reaction is finished, a second reacted mixture is obtained, the second reacted mixture is filtered to obtain a second reaction product, and the second reaction product is washed and dried to obtain the lubricant additive.

The prepared lubricant additive is added into a SF15W-40 lubricant according to a concentration of the prepared lubricant additive being 0.13 wt %.

Comparative Example 2

A preparation method of a lubricant additive includes the following steps.

Step 1, 1 g of kaolin and 0.5 g of HDTMS are added into 100 mL of deionized water, magnetic stirring is performed on the deionized water added with the kaolin and the HDTMS for 20 min, and then ultrasonic treatment is performed for 60 min to obtain a first mixture, the first mixture is stirred at 60° C. for 6 h to perform a first reaction, and after the first reaction is finished, a first reacted mixture is obtained, the first reacted mixture is centrifuged to obtain a first reaction product, and the first reaction product is washed and dried to obtain alkylated kaolin.

Step 2, 1 g of the alkylated kaolin obtained in the step 1 is added into 50 mL of a chelated lithium molybdate ionic liquid with a concentration of 1 wt % to obtain a second mixture, the second mixture is stirred at 90° C. for 10 h to perform a second reaction, and after the second reaction is finished, a second reacted mixture is obtained, the second reacted mixture is filtered to obtain a second reaction product, and the second reaction product is washed and dried to obtain the lubricant additive.

The prepared lubricant additive is added into a SF15W-40 lubricant according to a concentration of the prepared lubricant additive being 0.13 wt %.

Comparative Example 3

A preparation method of a lubricant additive includes the following steps.

Step 1, 1 g of kaolin and 0.5 g of HDTMS are added into 100 mL of deionized water, magnetic stirring is performed on the deionized water added with the kaolin and the HDTMS for 20 min, and then ultrasonic treatment is performed for 60 min to obtain a first mixture, the first mixture is stirred at 60° C. for 6 h to perform a first reaction, and after the first reaction is finished, a first reacted mixture is obtained, the first reacted mixture is centrifuged to obtain a first reaction product, and the first reaction product is washed and dried to obtain alkylated kaolin.

Step 2, 1 g of the alkylated kaolin obtained in the step 1 and 0.2 g of APTMS are added into 100 mL of deionized water, magnetic stirring is performed on the deionized water added with the alkylated kaolin and the APTMS for 30 min, and then ultrasonic treatment is performed for 20 min to obtain a second mixture, the second mixture is stirred at 80° C. for 10 h to perform a second reaction, and after the second reaction is finished, a second reacted mixture is obtained, the second reacted mixture is centrifuged to obtain a second reaction product, and the second reaction product is washed and dried to obtain amino/alkylated kaolin.

The prepared amino/alkylated kaolin is added into a SF15W-40 lubricant according to a concentration of the prepared amino/alkylated kaolin being 0.13 wt %.

Properties of anti-wear and friction reduction of the lubricants prepared in the embodiments 1-4 and the comparative examples 1-3 are tested by using an SGW-10A four-ball friction wear tester. Experimental steel balls adopt high-quality chromium alloy bearing steel GCr15, rockwell hardness of which is in a range of HRC 64-66, a diameter of which is 12.7 millimeters (mm), an experimental loading force of which is 147 newton (N), a rotation speed of which is 1,200 revolutions per minute (r/min), and a rotating time of which is 60 min. After the test is finished, the steel balls are cleaned, and then a wear scar diameter of the steel ball is obtained by using an optical microscope tube after the friction experiment, and a weight loss of the steel ball before and after the friction experiment is weighed by using a $\frac{1}{10000}$ electronic balance, and the test results are shown in the following Table 1.

TABLE 1

| | Coefficient of friction, wear scar diameter, and quality loss of different lubricant additives in the lubricant | | | |
|---|---|---|---|---|
| | Additive amount/ wt % | Coefficient of friction | Wear scar diameter/ mm | Weight loss/g |
| Embodiment 1 | 0.13 | 0.027 | 0.263 | 0.0000 |
| Embodiment 2 | 0.01 | 0.038 | 0.291 | 0.0001 |
| Embodiment 3 | 0.05 | 0.035 | 0.284 | 0.0000 |
| Embodiment 4 | 0.1 | 0.029 | 0.275 | 0.0000 |
| Comparative example 1 | 0.13 | 0.066 | 0.323 | 0.0012 |
| Comparative example 2 | 0.13 | 0.052 | 0.316 | 0.0008 |
| Comparative example 3 | 0.13 | 0.075 | 0.342 | 0.0014 |

The above only describes the illustrated embodiments of the disclosure, but the scope of the protection of the disclosure is not limited thereto. Moreover, those skilled in the related art can make equivalent substitutions or changes according to the technical solutions of the disclosure and the inventive concept thereof within the technical scope disclosed by the disclosure, and the equivalent substitutions or changes should be covered within the scope of the protection of the disclosure.

What is claimed is:

1. A preparation method of a chelated lithium molybdate lubricant additive, comprising the following steps:

step 1, adding kaolin and hexadecyltrimethoxysilane into deionized water, performing magnetic stirring and ultrasonic treatment on the deionized water added with the kaolin and the hexadecyltrimethoxysilane to obtain a first mixture, stirring the first mixture to perform a first reaction, and after the first reaction is finished, obtaining a first reacted mixture, filtering the first reacted mixture to obtain a first reaction product, washing and drying the first reaction product to obtain alkylated kaolin;

step 2, adding the alkylated kaolin obtained in the step 1 and (3-aminopropyl)trimethoxysilane into deionized water, performing magnetic stirring and ultrasonic treatment on the deionized water added with the alkylated kaolin and the (3-aminopropyl)trimethoxysilane to obtain a second mixture, stirring the second mixture to perform a second reaction, and after the second reaction is finished, obtaining a second reacted mixture, centrifuging the second reacted mixture to obtain a second reaction product, washing and drying the second reaction product to obtain amino/alkylated kaolin; and step 3, adding the amino/alkylated kaolin obtained in the step 2 into a chelated lithium molybdate ionic liquid to obtain a third mixture, stirring the third mixture to perform a third reaction, and after the third reaction is finished, obtaining a third reacted mixture, filtering the third reacted mixture to obtain a third reaction product, washing and drying the third reaction product to obtain the chelated lithium molybdate lubricant additive.

2. The preparation method as claimed in claim 1, wherein in the step 1, a mass-to-volume ratio of the kaolin:the hexadecyltrimethoxysilane:the deionized water is 1 gram (g):0.05-0.5 g:100 milliliters (mL).

3. The preparation method as claimed in claim 1, wherein in the step 1, a time for the magnetic stirring is in a range of 10 minutes (min) to 20 min; a time for the ultrasonic treatment is in a range of 30 min to 60 min; a temperature for the first reaction is in a range of 40 degrees Celsius (° C.) to 60° C.; and a time for the first reaction is in a range of 2 hours (h) to 6 h.

4. The preparation method as claimed in claim 1, wherein in the step 2, a mass-to-volume ratio of the alkylated kaolin:the (3-aminopropyl)trimethoxysilane:the deionized water is 1 g:0.05-0.2 g:100 mL.

5. The preparation method as claimed in claim 1, wherein in the step 2, a time for the magnetic stirring is in a range of 15 min to 30 min; a time for the ultrasonic treatment is in a range of 10 min to 20 min; a temperature for the second reaction is in a range of 50° C. to 80° C.; and a time for the second reaction is in a range of 4 h to 10 h.

6. The preparation method as claimed in claim 1, wherein in the step 3, a chemical formula of the chelated lithium molybdate ionic liquid is $Li_2C_{10}H_{16}N_2O_8Mo$, and a concentration of the chelated lithium molybdate ionic liquid is in a range of 0.1 wt % to 1 wt %.

7. The preparation method as claimed in claim 1, wherein in the step 3, a temperature for the third reaction is in a range of 70° C. to 90° C.; a time for the third reaction is in a range of 6 h to 10 h; and a mass-to-volume ratio of the amino/alkylated kaolin to the chelated lithium molybdate ionic liquid is 1 g:30-50 mL.

8. The preparation method as claimed in claim 1, wherein a preparation method of the chelated lithium molybdate ionic liquid comprises the following steps:

dissolving ethylenediaminetetraacetic acid in an ammonia solution to obtain an ethylenediaminetetraacetic acid solution with a concentration of 1 mole per liter (mol/L); and adding lithium acetate (LiOAc) and molybdenum nitrate ($Mo(NO_3)_4$) into the ethylenediaminetetraacetic acid solution according to a molar ratio of the ethylenediaminetetraacetic acid:Li:Mo being 1:1-2:0.5-1, and stirring the ethylenediaminetetraacetic acid solution added with the LiOAc and the $Mo(NO_3)_4$ to perform a fourth reaction at 80° C. for 2 h to obtain the chelated lithium molybdate ionic liquid.

9. A chelated lithium molybdate lubricant additive, wherein the chelated lithium molybdate lubricant additive is prepared by using the preparation method as claimed in claim 1.

10. A chelated lithium molybdate lubricant additive, wherein the chelated lithium molybdate lubricant additive is prepared by using the preparation method as claimed in claim 2.

11. A chelated lithium molybdate lubricant additive, wherein the chelated lithium molybdate lubricant additive is prepared by using the preparation method as claimed in claim 3.

12. A chelated lithium molybdate lubricant additive, wherein the chelated lithium molybdate lubricant additive is prepared by using the preparation method as claimed in claim 4.

13. A chelated lithium molybdate lubricant additive, wherein the chelated lithium molybdate lubricant additive is prepared by using the preparation method as claimed in claim 5.

14. A chelated lithium molybdate lubricant additive, wherein the chelated lithium molybdate lubricant additive is prepared by using the preparation method as claimed in claim 6.

15. A chelated lithium molybdate lubricant additive, wherein the chelated lithium molybdate lubricant additive is prepared by using the preparation method as claimed in claim 7.

16. A chelated lithium molybdate lubricant additive, wherein the chelated lithium molybdate lubricant additive is prepared by using the preparation method as claimed in claim 8.

17. An application method of the chelated lithium molybdate lubricant additive as claimed in claim 9, comprising: applying the chelated lithium molybdate lubricant additive in a lubricant, wherein a concentration of the chelated lithium molybdate lubricant additive in the lubricant is in a range of 0.01 wt % to 0.13 wt %.

18. An application method of the chelated lithium molybdate lubricant additive as claimed in claim 9, comprising: applying the chelated lithium molybdate lubricant additive in a lubricant, wherein the lubricant comprises: a mineral base oil, or synthetic base oil.

19. A preparation method of a chelated lithium molybdate lubricant additive, comprising the following steps:

step 1, adding kaolin and hexadecyltrimethoxysilane into deionized water, performing magnetic stirring and ultrasonic treatment on the deionized water added with the kaolin and the hexadecyltrimethoxysilane to obtain a first mixture, stirring the first mixture to perform a first reaction, and after the first reaction is finished, obtaining a first reacted mixture, filtering the first reacted mixture to obtain a first reaction product, washing and drying the first reaction product to obtain alkylated kaolin; wherein a mass-to-volume ratio of the kaolin:the hexadecyltrimethoxysilane:the deionized water is 1 g:0.05-0.5 g:100 mL;

step 2, adding the alkylated kaolin obtained in the step 1 and (3-aminopropyl)trimethoxysilane into deionized water, performing magnetic stirring and ultrasonic treatment on the deionized water added with the alkylated kaolin and the (3-aminopropyl)trimethoxysilane to obtain a second mixture, stirring the second mixture to perform a second reaction, and after the second reaction is finished, obtaining a second reacted mixture, centrifuging the second reacted mixture to obtain a second reaction product, washing and drying the second reaction product to obtain amino/alkylated kaolin; wherein a mass-to-volume ratio of the alkylated kaolin: the (3-aminopropyl)trimethoxysilane:the deionized water is 1 g:0.05-0.2 g:100 mL; and step 3, adding the amino/alkylated kaolin obtained in the step 2 into a chelated lithium molybdate ionic liquid to obtain a third mixture, stirring the third mixture to perform a third reaction, and after the third reaction is finished, obtaining a third reacted mixture, filtering the third reacted mixture to obtain a third reaction product, washing and drying the third reaction product to obtain the chelated lithium molybdate lubricant additive; wherein a concentration of the chelated lithium molybdate ionic liquid is in a range of 0.1 wt % to 1 wt %, and a mass-to-volume ratio of the amino/alkylated kaolin to the chelated lithium molybdate ionic liquid is 1 g:30-50 mL.

20. The preparation method as claimed in claim 19, wherein in the step 1, a time for the magnetic stirring is in a range of 10 min to 20 min; a time for the ultrasonic treatment is in a range of 30 min to 60 min; a temperature for the first reaction is in a range of 40° C. to 60° C.; and a time for the first reaction is in a range of 2 h to 6 h;

wherein in the step 2, a time for the magnetic stirring is in a range of 15 min to 30 min; a time for the ultrasonic treatment is in a range of 10 min to 20 min; a temperature for the second reaction is in a range of 50° C. to 80° C.; and a time for the second reaction is in a range of 4 h to 10 h; and wherein in the step 3, a chemical formula of the chelated lithium molybdate ionic liquid is $Li_2C_{10}H_{16}N_2O_8Mo$, a temperature for the third reaction is in a range of 70° C. to 90° C.; and a time for the third reaction is in a range of 6 h to 10 h.

* * * * *